US005968575A

United States Patent [19]

Rasmussen

[11] Patent Number: 5,968,575

[45] Date of Patent: Oct. 19, 1999

[54] METHOD FOR INJECTING A PRODUCT INTO A FLUID, AND AN APPARATUS FOR CARRYING OUT THE METHOD

[75] Inventor: Carsten Ole Rasmussen, Glostrup, Denmark

[73] Assignee: Niro Holding A/S, Søborg, Denmark

[21] Appl. No.: 08/403,817

[22] PCT Filed: Jan. 24, 1995

[86] PCT No.: PCT/DK95/00035

§ 371 Date: Mar. 14, 1995

§ 102(e) Date: Mar. 14, 1995

[87] PCT Pub. No.: WO96/22830

PCT Pub. Date: Aug. 1, 1996

[51] Int. Cl.[6] .................................. A23L 3/00; B01F 7/00

[52] U.S. Cl. ............................... 426/511; 99/453; 99/460; 261/76; 261/DIG. 26; 261/DIG. 76; 366/172.2; 366/304; 422/26; 426/467; 426/474; 426/522

[58] Field of Search .................................... 426/511, 521, 426/522, 467, 474; 99/460, 453; 422/26; 366/304, 172.2; 261/76, DIG. 26, DIG. 76; 159/16.3, 48.1

[56] References Cited

U.S. PATENT DOCUMENTS

| | | | |
|---|---|---|---|
| 3,231,242 | 1/1966 | Schrier | 366/304 |
| 4,416,548 | 11/1983 | Carre et al. | 366/304 |
| 5,590,961 | 1/1997 | Rasmussen | 366/304 |

FOREIGN PATENT DOCUMENTS

| | | |
|---|---|---|
| 34 17 242 | 11/1985 | Germany . |
| 31 27 684 | 9/1989 | Germany . |

*Primary Examiner*—George Yeung
*Attorney, Agent, or Firm*—Sughrue, Mion, Zinn, Macpeak & Seas, PLLC

[57] ABSTRACT

In injection of steam, gas, liquid or a powdered or granulate product into a fluid in an injection apparatus having a substantially disc-shaped rotor (53), a product inlet (50) and a central product outlet (57), the injection is carried out in an annular injection zone above the disc-shaped rotor (53) at a distance from both the circumference and the center of the rotor (53). The fluid product which may be a liquid with considerable variation of dry solids content and viscosity is exposed to a radial displacement effect as well as a tangential dispersion effect.

21 Claims, 3 Drawing Sheets

METHOD FOR INJECTING A PRODUCT INTO A FLUID, AND AN APPARATUS FOR CARRYING OUT THE METHOD

BACKGROUND OF THE INVENTION

1. Field of the Invention

The invention relates to a method of injecting a product into a first fluid, whereby in an injection apparatus having a substantially disc-shaped rotor, a radial displacement effect is imparted to the first fluid, said product being injected into a limited intermediate zone above the disc-shaped rotor displaced from both the center and the circumference of the rotor, in which zone the first fluid is exposed to a tangential dispersion effect in addition to said displacement effect.

2. Description of the Related Art

Such an injection method is known from published international patent application WO 94/13395.

Without in any manner being restricted thereto, the method according to the invention has substantial fields of application in, partly, heat treatment of liquids by injection of steam. For example, bactericidal UHT treatment of milk products or pregelatinization of starch products, partial injection of gases, for example $CO_2$ or nitrogen into such liquids which are subsequently to be spray dried with the aim of reducing the density of a powder product obtained by the spray drying, partial injection of a liquid, for example water, into certain fatty or oily products with a view to reduction of the fat content and partly mixing of a solid product in powder or granulate form into a liquid.

In connection with the spray drying of food products, for example milk products or fruit juice, it is known from U.S. Pat. Nos. 3,185,580 and 3,222,193 to inject a gas directly into an elongated mixing pipe through which the liquid starting material flows before supply to an atomizer in the spray drying apparatus. This type of gas injection is not suitable for heat treatment at higher temperatures, as it will inevitably lead to burning. Actually, the above patents also direct that a heat treatment of the product, for example for pasteurization purposes, be made in a conventional preheater.

U.S. Pat. No. 3,182,975 describes an apparatus for heat treatment of milk products at an increased temperature after prior preheating by injection of steam into a mixing chamber to which the product to be treated is supplied. Steam injection is carried out by means of a propeller-like rotor with perforated tubular blades where the steam extravasates on the back of the rotor blades seen in the direction of rotation at a relatively low pressure, whereby the pressure is increased through the mechanical influence from the rotation of the rotor. The intention is to obtain a rapid heating without burning.

SU patent specification No. 578046 describes another method of heat treatment of milk products where the product is also supplied to a mixing chamber by a propeller-like rotor. In the '046 specification the steam supply is made via a distributor system with annular distributing conduits arranged concentrically in relation to the rotor and controlled by means of a valve arrangement so that the steam in the central area of the chamber is supplied at a relatively low temperature and pressure, and in the peripheral area at a substantially increased temperature and pressure. The intention is to obtain a very rapid heating to sterilization level after a preheating in the central area. In this construction, however, the strong heat influence at the periphery involves a considerable risk of burning.

It is known from US patent specification No. 4,479,908 to inject gas into a fluid product of a higher density by a method in which a strong turbulence and high flow velocity are imparted to the fluid product by passing it through a conduit part with a curved wall in connection with a constricted flow section where the gas injection takes place through an adjustable nozzle. According to the patent, the method may also be used for heat treatment of milk products by injection of steam at a temperature of about 170° C.

CH patent specification No. 531363 describes an apparatus for mixing a liquid raw material with a gas, for example with a view to foaming. Mixing takes place in a mixing chamber by means of a rotor disc with projecting teeth moving between stationary teeth in a surrounding stator part, the rotor disc performing an eccentric circulatory movement about the axis of the stator frame.

Similar embodiments of mixing heads with a rotor provided with teeth engaging with teeth in a stator system where the sets of teeth may be arranged in several steps mutually displaced in the radial and axial directions are known from DE patent No. 3127684, EP patent application No. 0253139 and published international patent application No. WO 91/07221.

Whereas, in the two latter mixing methods the supply of the fluid product to be treated, and the injection of gas take place at the same place in the mixing chamber, preferably in its central part, the method disclosed in DE-C-3127684 provides for injection of the gas into a working space displaced from the inlet and outlet and delimited by projecting toothed rims from the rotor and stator, respectively.

SUMMARY OF THE INVENTION

In all these prior art mixing methods as well as the injection method disclosed in WO 94/13395 the fluid product to be treated is caused to flow radially from center towards the circumference of the rotor. Whereas this does not play a significant role for pure mixing processes experiments have shown that in heat treatment processes the heated products may have a residence period in the rotor after the heat treatment of a duration entailing a risk of burning the product and formation of build-up deposits of burned material.

The method of the invention is distinguished from this prior art in that radial displacement is imparted with a direction from the circumference towards the center of the rotor.

By injecting the product, which, as mentioned above, may be both steam or gas, a liquid, for example water, or a powdered or granulate product in a limited zone in the rotor casing, an exposing at the same time the first fluid to both a radial displacement effect directed from the circumference towards the center of the rotor and a tangential dispersion effect, it has proved possible not only to optimize injection for a large number of different applications, but at the same time avoid deposits in heat treatment processes.

In connection with heat treatment of foodstuffs and other products, for example the above UHT treatment of milk products, where heating to a temperature of about 120–150° C. is required in order to obtain the desired bactericidal effect, the method according to the invention thus, in comparison with prior art, causes an almost instantaneous heating as a result of the simultaneous dispersion and displacement which causes an optimum distribution of the injected fluid. After heat treatment the treated product is quickly discharged through the outlet which is provided in the central part of the apparatus.

As a result of this, for example, UHT treatment of milk products may be carried out with a higher degree of retention of the original taste and nutritional qualities than possible so far, and without any form of burning.

In a preferred embodiment of the method, the displacement and dispersion effects are caused by having the first fluid forced through slots in circumferential wall parts of the rotor and stationary wall parts of an oppositely positioned stator.

The first fluid which is treated by means of the method according to the invention will preferably be a liquid, which may, however, exhibit considerable variation with regard to viscosity and dry solids content, ranging from a mobile liquid without any solids to a viscous paste-like consistency with a dry solids content of up to 90 per cent.

The invention also relates to an apparatus for injecting a product into a first fluid by the method defined in the foregoing, comprising a substantially disc-shaped rotor positioned parallel to and coaxial with a stator in a casing and having an inlet and an outlet for said first fluid arranged to define a mainly radial flow path for said first fluid, feed passages being formed in the stator for injection of the product into a limited intermediate zone above the rotor displaced from both the center and the circumference of the rotor.

The apparatus according to the invention is characterized in that the inlet opens into a part of the casing outside the circumference of the rotor, whereas said outlet is arranged in a central part of the stator.

To obtain a good distribution of the second fluid during its introduction in the injection chamber is provided on the side facing the stator with at least one projecting cylindrical wall and the stator is provided on the side facing the rotor with at least two projecting coaxial cylindrical walls disposed on either side of the cylindrical wall on the rotor sharp-edged slots being formed to extend substantially parallel to the axis of the rotor in said coaxial cylindrical walls on the rotor and the stator. The rotor may suitably have two projecting coaxial cylindrical walls projecting upwards, of which the radially innermost wall will be located radially inside the radially innermost wall of the stator.

In a preferred embodiment of the apparatus the sharp-edged design of the slots in the cylindrical walls, which is important to an efficient dispersion effect, is obtained by the axis-parallel slots in the cylindrical walls being formed as axially directed bores from the free edges of these walls and having a diameter exceeding the wall thickness.

As a substantial additional advantage it has proved possible to design the apparatus in an embodiment which is substantially more silent at steam injection into a liquid than the prior art apparatuses, in that the axis-parallel slots in the cylindrical walls are asymmetrically distributed in the circumferential direction.

BRIEF DESCRIPTION OF THE DRAWING

The invention will now be described in further detail below with reference to an embodiment shown in the drawing and by means of examples. In the drawing.

DESCRIPTION OF THE PREFERRED EMBODIMENT

Figure 1:
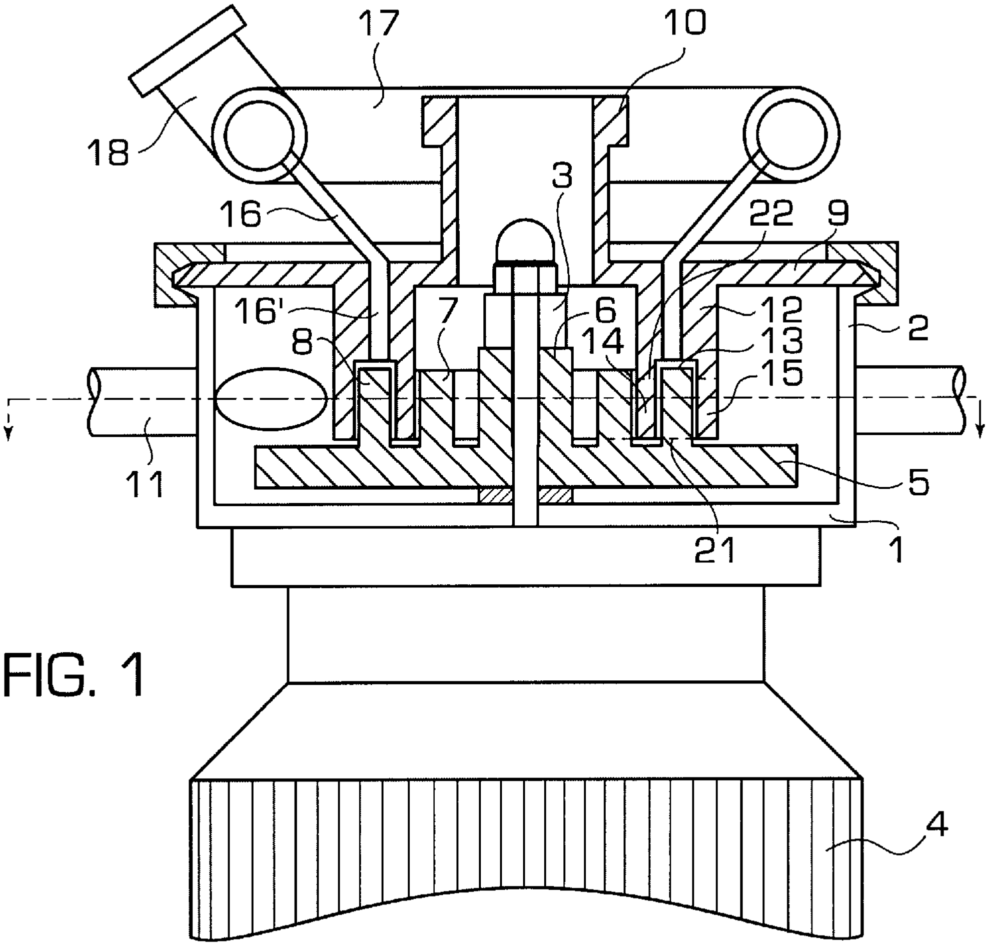
FIG. 1 shows an axial cross-sectional view of a preferred embodiment of an apparatus according to the invention.
Figure 2:
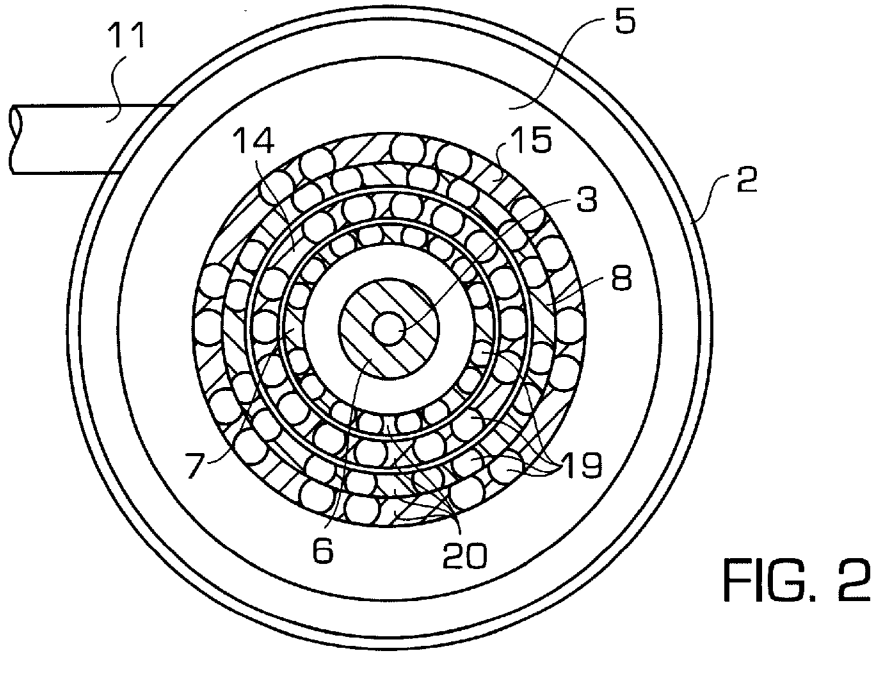
FIG. 2 is a section along the line II—II in FIG. 1.

In the embodiment shown in FIGS. 1 and 2, the apparatus according to the invention is of the same general structure as the apparatus disclosed in the above-mentioned international patent application WO 94/13395 comprises a relatively flat cylindrical casing having a bottom 1 and a side wall 2. A rotor disc 5 is fastened on a drive shaft 3 projecting through the bottom 1 and being connected with a driving engine 4 arranged below the casing. The rotor disc 5 has two concentric walls 7 and 8 arranged radially displaced from the hub bush 6 arranged on the drive shaft 3, whereas the rotor 5 is shown with a mainly flat base it can take any convenient form as suggested in the prior art e.g. as disclosed in the references mentioned herein before.

An inlet pipe 11 for the fluid to be treated in the apparatus is connected with the side wall 2 of the rotor casing. The casing is closed upwards by a stator cover 9 in which a central outlet pipe 10 is provided for discharge of the product.

Corresponding to the cylindrical walls 7 and 8 projecting upwards from the upper side of the rotor disc 5, the lower side of the stator cover 9 facing the rotor disc is formed with a tube 12 projecting downwards, at the lower end of which an annular chamber 13 is formed between two coaxial cylinder walls 14 and 15. The tube structure 12 is arranged on the lower side of the stator cover 9 so that the walls 14 and 15 are positioned on either side of the radially outermost wall 8 projecting upwards on the rotor disc 5, when the stator cover 9 is arranged on the casing 1, 2. The coaxial cylinder walls 7, 8, and 14, 15 on the rotor disc 5 and the stator cover 9, respectively, are designed with such wall thicknesses and positions that they engage with each other with relatively little clearance.

A number of tubular channels 16 are connected with an annular injection chamber 13 through bores 16' in the tube structure 12, and with an annular distributor pipe 17, to which a feed pipe 18 is connected for supply of the product to be injected into the fluid flowing through the apparatus from the peripheral inlet pipe 11 to the central outlet pipe 10.

As best appears from FIG. 2, each of the cylindrical walls 7, 8 and 14, 15 on the rotor disc 5 and the stator cover 9, respectively, are divided into tooth-like wall segments 20 by a number of slots 19. In the embodiment shown, each of the walls thus has a total of sixteen such slots, but this number may be varied within wide limits.

To obtain a very sharp-edged form of the individual slots 19 both at the inner side and the outer side of each of the cylindrical walls 7, 8 and 14, 15, which form is advantageous to the desired dispersion effect, the slots are preferably formed as axial bores in the walls from the free end edges thereof. The slots have a diameter exceeding the wall thickness and a depth of bore which may, for example, be as shown by the dashed lines 21 and 22 in FIG. 1.

As a result of the wall geometry, the radially outermost wall on the rotor disc 5 will rotate in the injection chamber 13 formed between the stator walls 14 and 15, while the radially innermost wall 7 on the rotor disc 5 rotates on the inside of the radially innermost stator wall 14 and together with it ensures good distribution of the product supplied through the feed pipe 18, before the product is passed into the chamber 13. The radially innermost rotor wall 7 is not, however, strictly necessary.

The rotational velocity for the rotor disc 5 may vary from 100 to several 1000 rpm depending on the current purpose of application.

The fluid supplied through inlet pipe 11 is forced through the slots 19 in the rotor and stator walls 15, 8, 14 and 7 during the rotation and finishes by being passed out through the outlet 10.

The product supplied through the feed pipe 18, the distributor pipe 17 and the channels 16 may be steam, gas or liquid or a powdered or granulate product. It is injected into the second fluid in the injection chamber 13 between the stationary chamber walls 14 and 15, and owing to the radial displacement effect and the tangential comminuting or dispersion effect deriving from the sharp-edged slots, an instantaneous entrainment of the injected product is obtained so that by heat treatment. For example, an almost instantaneous temperature increase is obtained without burning, which is due on one hand to the wall geometry with the little clearance between the walls 7, 8, 14 and 15 and the slots 19 therein, and, on the other hand, to the fact that after passage through the injection chamber 13 the treated fluid only remain in the rotor casing a very short time before being discharged through the central outlet pipe 10.

Figure 3:
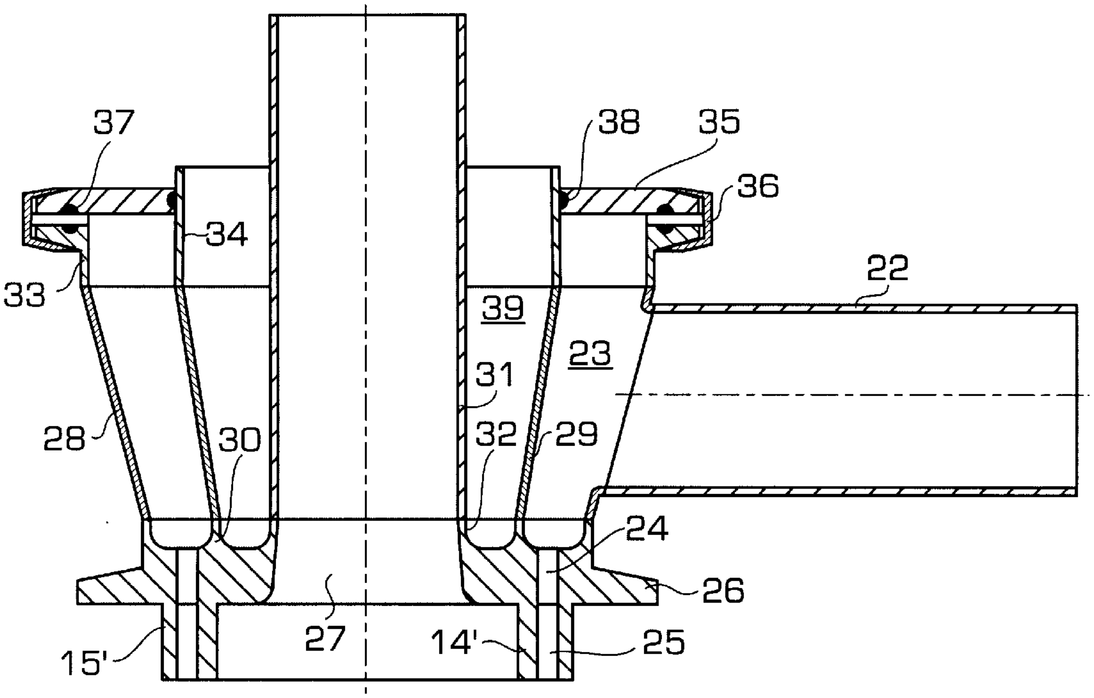
FIGS. 3 and 4 alternative designs of the stator part of the apparatus shown in FIGS. 1 and 2.

In FIG. 3 an alternative design of the stator cover is shown in which the product to be injected into the fluid, which may for instance be steam, which may be of any pressure suitable for the actual application, i.e both above and below atmospheric pressure, is supplied through a pipe section 22 to an annular feed chamber 23 communicating in a bottom region with a number of channels 24 leading to the annular clearance 25 between the cylindrical walls 14 and 15 in which the upwardly projecting cylindrical wall 8 on the rotor is received when the stator is connected with the rotor.

As illustrated the alternative stator design in FIG. 3 may be divided into several parts to facilitate its manufacture. A lower part 26 forms the stator cover to be connected with the rotor to close the rotor casing upwardly and is provided with a central outlet opening 27. The supply pipe section 22 for the product to be injected is connected with an opening in a funnel shaped intermediate wall 28, whereas the feed chamber 23 is inwardly limited by a separate funnel-shaped wall section 29 joining an upwardly projecting wall section 30 on the lower cover part 26. Similarly a separate outlet pipe 31 joins an upwardly projecting wall section 32 around the central outlet opening 27 in cover part 26.

Upwardly an external collar 32 is arranged in an extension of funnel-shaped wall 28 and a cylindrical wall section 33 in an extension of funnel-shaped wall part 29. The feed chamber 23 is closed upwardly by an annular disc-shaped cover 35 connected with the external collar 33 by a clamping member 36 and joining the external collar 33 as well as the cylindrical wall section 34 via sealing members 37 and 38, respectively.

By this relatively simple design the complexity of the feed structure with numerous separate tubular channels in the embodiment of FIGS. 1 and 2 is avoided. The intermediate funnel-shaped wall section serves to form an intermediate space 39 around the central outlet pipe 31 to avoid transfer of heat from the steam supplied through channel 22 to the product discharged through outlet tube 31. If desired the annular space 39 surrounding the outlet tube 31 may serve as a cooling channel or accommodate other cooling means.

Figure 4:
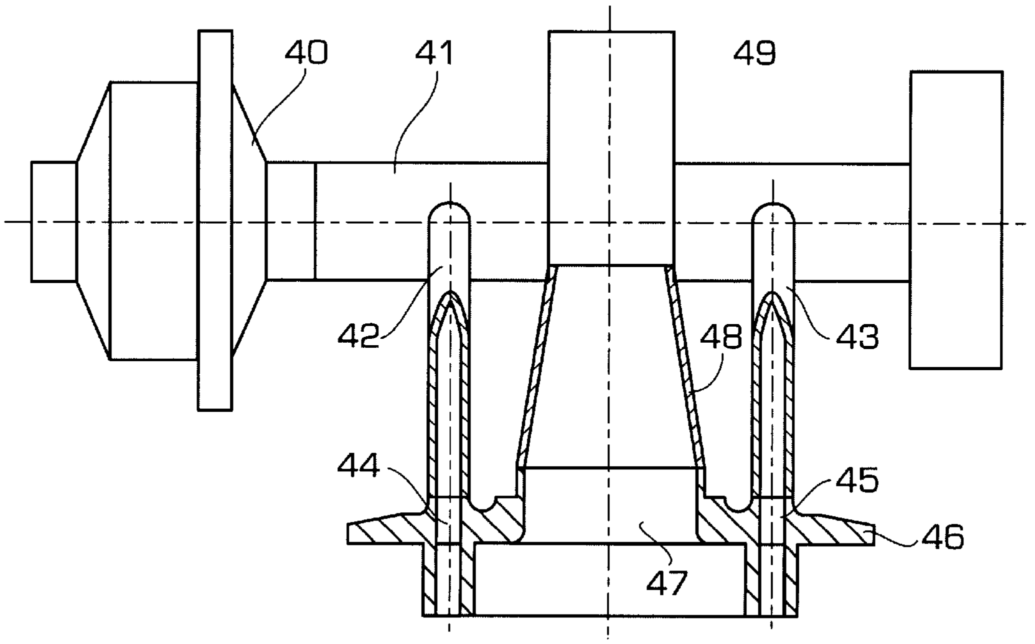

FIG. 4 shows another alternative design of the stator part of the apparatus intended in this case for supplying carbon dioxide as the product to be injected into the fluid treated in the apparatus. A carbon dioxide generator 40 is discharging carbon dioxide into a substantially linear pipe section 41 to which two branch channel 42 and 43 are connected the channels leading to diametrically opposed channels 44 and 45 in the lower cover part 46 serving to close the rotor casing and formed at its underside with projecting cylindrical walls 14" and 15" matching the configuration of upwardly projecting cylindrical walls 7 and 8 on the rotor. Also in this case a central outlet opening 47 is formed in the cover part 46 and connected with separate outlet pipe sections 48 and 49 in an extension thereof. The branch channels 42 and 43 are shown partly in section.

Figure 5:
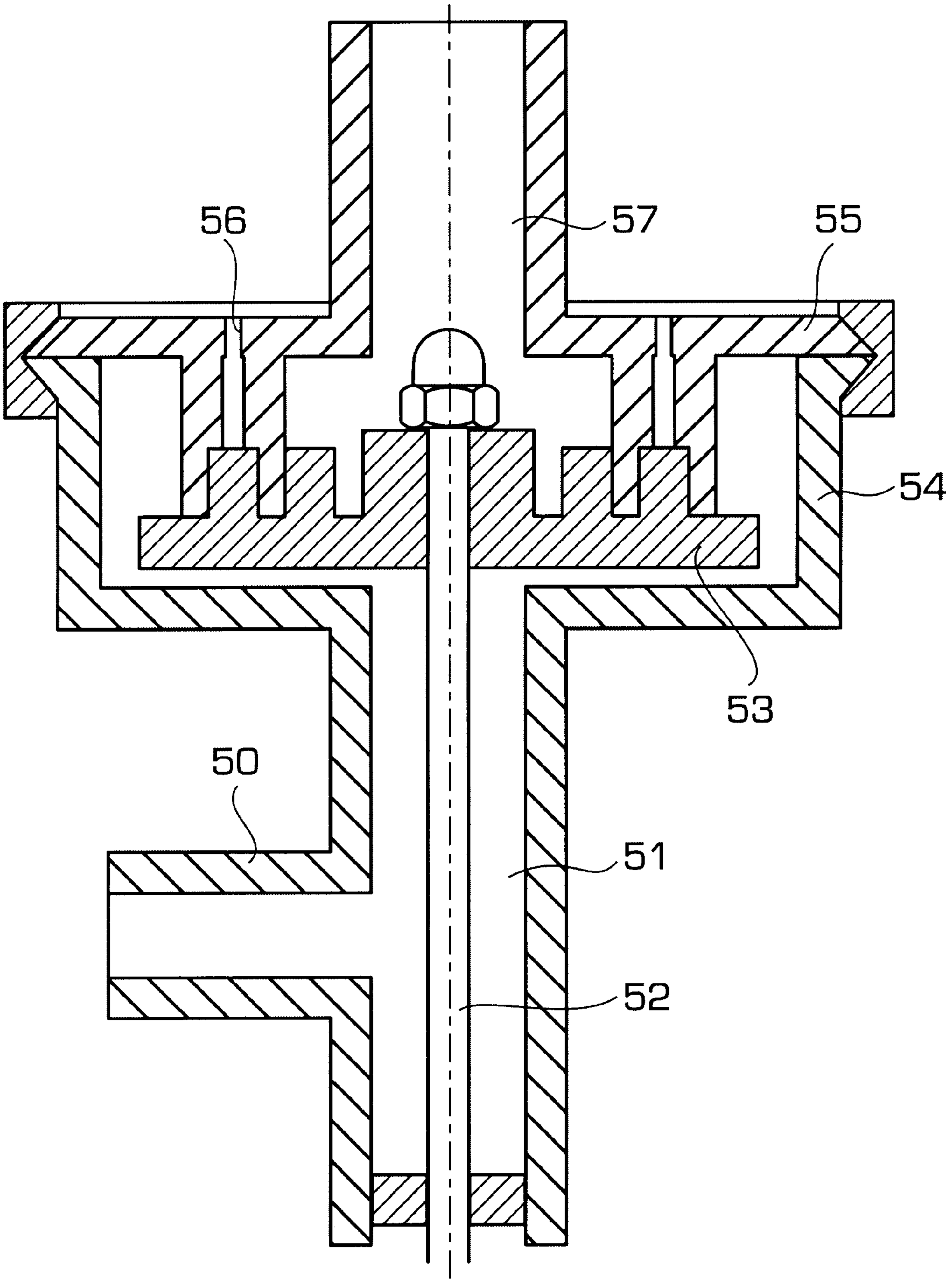
FIG. 5 a further alternative design of the apparatus.

FIG. 5 illustrates schematically a modified design of the rotor casing where a fluid inlet pipe 50 is connected to a central pipe section 51 surrounding the shaft 52 of the rotating disc-shaped rotor 53. The central pipe section 51 is connected with the bottom of the rotor casing 54, which is closed upwardly by the stator cover 55 in which feed passages 56 for the product to be injected as well as a central outlet 57 are provided.

As a further explanation of the invention, some non-restricting examples carried out in practice are given below.

The following examples were carried out using the above embodiment of the apparatus according to the invention, in all cases with a rotary velocity of 2800 rpm.

EXAMPLE 1

A baby food product "Instant Formula" with a dry solids content of 42 per cent by weight and a viscosity of 52 cP was heat treated by injection of steam at a vapour pressure of 500 KPa and a temperature of 159° C. from an initial temperature of 72° C. to a sterilization temperature of 120° C. As a result of the heat treatment, the desired sterilization was obtained with a mortal effect on spore-forming bacteria and their spores. This result was obtained without any kind of burning, discoloration or other destruction of functional properties in the product.

EXAMPLE 2

A baby food product "Follow-Up Formula" with a dry solids content of 40.2 per cent by weight and a viscosity of 48 cP was heated by steam injection at a vapour pressure of 500 KPa from an initial temperature of 67° C. to a sterilization temperature of 120° C. with the same good results as stated in Example 1.

These examples illustrate only to a limited extent the application potential for the method and the apparatus according to the invention, but confirm the good results obtained by steam injection.

With regard to the application potential in general, the method and the apparatus according to the invention as mentioned above, are suitable for fluid products with a dry solids content ranging from 0 to 90 per cent by weight both in connection with steam injection and by injection of a cold gas. The viscosity may also vary within a wide range from 0.1 to 100,000 cP.

Also with regard to products, the method and the apparatus according to the invention have numerous capabilities within the treatment of food products, such as heat treatment, density-reducing gas injection, gelatinizing, and emulgation, and for technical products, such as plastic materials to be foamed.

I claim:

1. A method of injecting a product into a fluid by use of an injection apparatus having a stator with a central part and a generally circular and disc-shaped rotor having a center and a circumference, said rotor being positioned parallel to and coaxial with said stator, said method comprising the steps of; supplying said fluid to a fluid inlet outside said circumference of the rotor, imparting an inward radial displacement effect to said fluid from said inlet through an annular injection zone on one side of the rotor intermediate said center and said circumference thereof towards a fluid outlet which opens into said central part of the stator, injecting said product into said injection zone, imparting to said fluid in said injection zone a tangential displacement effect in addition to said radial displacement effect and causing said fluid to flow quickly from said injection zone towards said outlet to provide a very short residence time for the fluid between said injection zone and said outlet.

2. The method according to claim 1, wherein said radial displacement and tangential dispersion effects are caused by forcing said fluid through sharp-edged slots extending substantially parallel to the rotor axis in opposed coaxial cylindrical wall parts of said rotor and said stator.

3. The method according to claim 1, wherein said fluid is a liquid with a dry solids content ranging between 0 and 90 per cent.

4. The method according to claim 1, wherein said product is a fluid product.

5. The method according to claim 1, wherein said product is steam which is injected at a temperature in the range of 60 to 200° C. and a vapor pressure in the range of 0.25 to 12 bar for instantaneous heating of the fluid.

6. The method according to claim 3, wherein said fluid is a concentrate dairy product.

7. The method according to claim 6, wherein said concentrated dairy product is a milk concentrate.

8. The method according to claim 5, wherein said steam is injected at a temperature in the range of 105 to 165° C. and a vapor pressure in the range of 1.2 to 6 bar.

9. The method according to claim 2, wherein said fluid is a starch product capable of gelatinization.

10. The method according to claim 4, wherein said product is a gas which is injected for reduction of the density of the fluid or a product obtained by spray drying thereof.

11. The method according to claim 4, wherein said product is a liquid which is injected for emulsification of or into said fluid.

12. An apparatus for injecting a product into a fluid, comprising; a casing, a stator arranged in said casing and having a central part, a generally circular and disc-shaped rotor having a center and a circumference and being positioned parallel to and coaxial with said stator, an inlet for said fluid connected with said casing outside said circumference of the rotor, an outlet for said fluid opening into said central part of the stator, said inlet and outlet defining an inwardly directed substantially radial flow path for said fluid, feed passages formed in said stator for injection of said product, and an annular injection zone provided on one side of said rotor intermediate said center and circumference thereof to receive said product injected through said passages, whereby said fluid is caused to flow quickly from said injection zone towards said outlet to provide a very short residence time for the fluid between said injection zone and said outlet.

13. The apparatus according to claim 12, wherein the rotor is provided on the side facing the stator with at least one projecting cylindrical wall and the stator is provided on the side facing the rotor with at least two projecting coaxial cylindrical walls disposed on either side of the cylindrical wall on the rotor, sharp-edged slots being formed in said coaxial cylindrical walls to extend substantially parallel to the axis of the rotor.

14. The apparatus according to claim 13, wherein the rotor has two projecting coaxial cylindrical walls, the radically innermost wall of which is located radially inside the radially innermost wall on the stator.

15. apparatus according to claim 13, wherein said projecting coaxial cylindrical walls are positioned with a clearance in a radial direction.

16. The apparatus according to claim 13, wherein said slots are formed as axially directed bores from free edges of said walls and having a diameter exceeding the wall thickness.

17. The apparatus according to claim 13, wherein said slots are distributed asymmetrically in a circumferential direction.

18. The apparatus according to claim 12, wherein said feed passages comprises a number of tubular channels opening into an injection chamber defining said annular injection zone.

19. The apparatus according to claim 12, wherein said feed passages comprises an annular feed chamber forming an integral part of the stator and being connected with said feed passages.

20. The apparatus according to claim 12, wherein said outlet is surrounded by a cooling means.

21. The apparatus according to claim 12, wherein said inlet comprises an outlet pipe arranged opposite a central part of the side of the rotor facing away from said annular injection zone.

* * * * *

UNITED STATES PATENT AND TRADEMARK OFFICE

CERTIFICATE OF CORRECTION

PATENT NO. : 5,968,575

DATED : October 19, 1999

INVENTOR(S) : Carsten Ole Rasmussen

It is certified that error appears in the above-indentified patent and that said Letters Patent is hereby corrected as shown below:

Column 7, lines 3-4, delete "tangential displacement effect" and insert --tangential dispersion effect--.

Signed and Sealed this

Thirteenth Day of March, 2001

Attest:

Nicholas P. Godici

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 5,968,575 
DATED : February 9, 1999
INVENTOR(S) : Brian W.S. Kolthammer and Robert S. Cardwell It is certified that error appears in the above-identified patent and that said Letters Patent is hereby corrected as shown below:

Title page,
Item [63], the "Related U.S. Application Data" should read -- Continuation of Ser. No. 510,527, Aug. 2, 1995, abandoned; which is a continuation of Ser. No. 10,958, Jan. 29, 1993, abandoned. --

Signed and Sealed this

Ninth Day of July, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 5,968,575 Page 1 of 1
DATED : October 19, 1999
INVENTOR(S) : Carsten Ole Rasmussen It is certified that error appears in the above-identified patent and that said Letters Patent is hereby corrected as shown below:

This certificate supersedes Certificate of Correction issued July 9, 2002, the number was erroneously mentioned and should be vacated since no Certificate of Correction was granted.

Signed and Sealed this

Tenth Day of December, 2002

JAMES E. ROGAN
*Director of the United States Patent and Trademark Office*